Oct. 9, 1928.
J. C. JOHNSON
GRASS CONVEYER FOR LAWN MOWERS
Filed Sept. 7, 1927
1,686,563
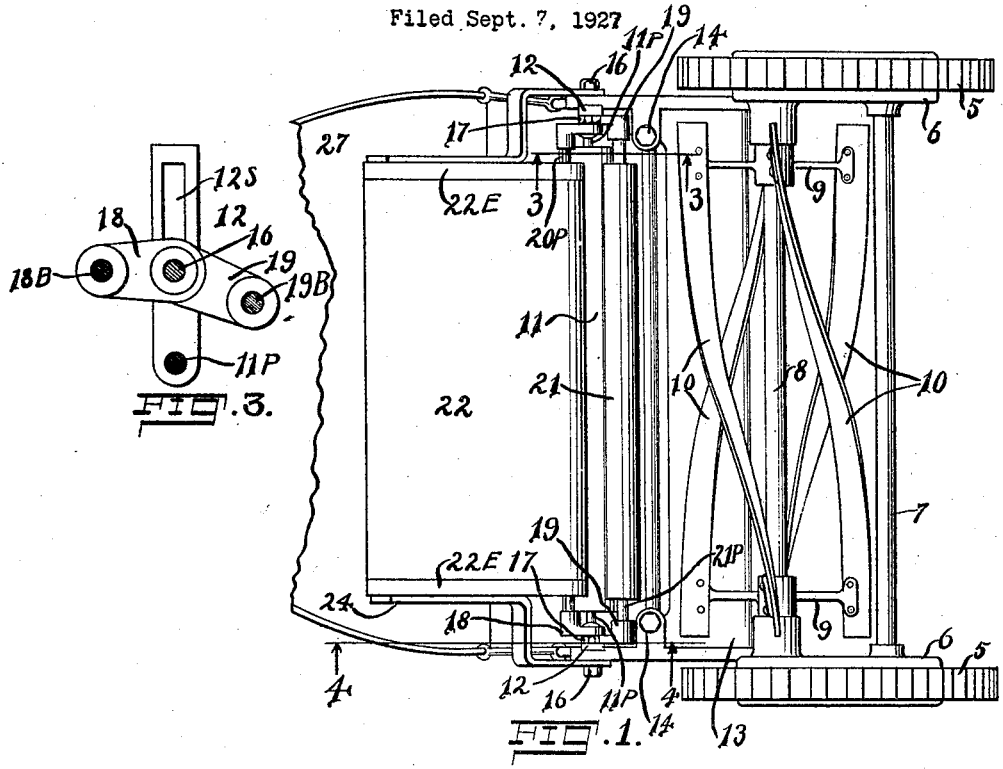
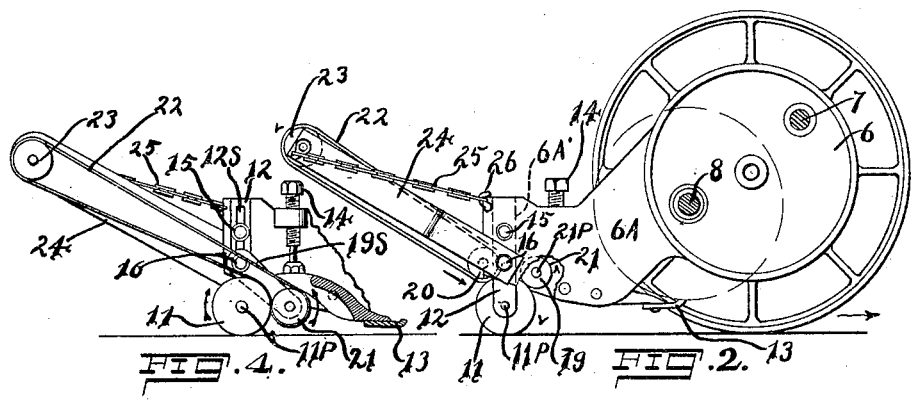
INVENTOR:
John Conrad Johnson
BY David E. Carlsen
ATTORNEY Patented Oct. 9, 1928.

1,686,563

UNITED STATES PATENT OFFICE.

JOHN CONRAD JOHNSON, OF ST. PAUL, MINNESOTA.

GRASS CONVEYER FOR LAWN MOWERS.

Application filed September 7, 1927. Serial No. 217,997.

My invention relates to improvements in mowers, particularly lawn mowers, and the main object is to provide a simple, efficient, and inexpensive device, especially adapted for catching all the grass cut by the cutter reel and thrown rearwardly therefrom, and further to convey the grass to a place within a grass catcher to be dropped therein in the most efficient manner. Further objects and advantages will appear in the following specification reference being had to the accompanying drawing in which:—

Fig. 1 is a top or plan view of a lawn mower embodying my invention.

Fig. 2 is a right side elevation of Fig. 1 but with the right hand drive wheel removed and the cutter reel also omitted.

Fig. 3 is an enlarged detail view of the pivoted roller bearing members of my device and the slotted member to which they are attached, about as on line 3—3 in Fig. 1.

Fig. 4 is a vertical right side elevation partly in section, of my device in a modified form, as it would actually appear on the vertical plane indicated by the arrows 4—4 in Fig. 1.

Referring to the drawing by reference numerals, 5 designates the traction or ground wheels of any lawn mower at the inner side of each of which is a gear housing 6 both rigidly connected by a bar 7. Each housing 6 contains gears (not shown) which are driven by the ground wheels and drive a reel shaft 8 with spiders 9 holding the reel or cutter blades 10.

11 is the usual ground roller trailing the ground wheels and having end pins $11^P$ bearing in the lower end of a vertical bearing bar 12 slidably retained in a vertical recess $6^{A'}$ at the rear end of each arm $6^A$ extending rearwardly one from each housing 6.

13 is the usual knife bar cooperating with the reel blades 10 to cut grass, said knife bar being adjustable to contact with the blades by a set screw 14 or other suitable means.

15 and 16 are respectively an upper and a lower bolt each in an aperture in the rear part of each arm $6^A$ and both of said bolts at each side are passed through a slot $12^S$ in bar 12 and carrying a nut 17 inwardly of the said bar.

In Figs. 1 and 3 each bolt 16 is passed through overlapped ends of two bearing levers 18—19 of which 18 extends rearwardly from the bolt and has a bore $18^B$ for an end pin, $20^P$ of a roller 20 and lever 19 extends forward of the bolt and has a bore $19^B$ for an end pin $21^P$ of another roller 21. The arm levers 19 are adjusted so that roller 21 bears against the ground roller 11 forward of the vetical center line of the latter (see Fig. 2) and roller 20 is engaged by an endless fabric belt 22 bearing against roller 11 at its top part and rearward of its center. Said belt extends rearwardly and upwardly in an inclined plane and its rear part engages another roller 23 mounted parallel to roller 20 between side brackets 24, the forward ends of said brackets being apertured for the bolts 16 each of which is adapted to clamp its bracket 24 to the outer side of arm $6^A$ when the endless belt or conveyer has been set at a desired angle. 25 is a chain suitably fixed to the upper end of each bracket 24 and extending forward toward the rear upper corner of arm $6^A$ where a hook 26 is provided to be engaged by a link of the chain to thus hold the upper part of the conveyer at a desired angle.

$22^E$ in Fig. 1 indicates edging on the conveyer belt 22 preferably of rubber, said edging being on both sides of the belt if so desired, the object being to have this edging engage the rollers and eliminate slippage.

27 is Fig. 1 indicates a grass catcher of the well-known type used on lawn mowers, removably fixed to the rear part of the mower and on the bottom of which grass is caught and accumulates as the mower is working.

In the modification Fig. 4, a longer belt 22 is used and its forward end runs over roller 19, roller 20 being omitted. In this case the roller 19 is comparatively low and the belt 22 frictionally engages roller 11 and is driven thereby, thence under roller 19 and upwardly with its upper run. $19^S$ indicates a special long armed bearing used at each end of the roller.

In the use of my device the lawn mower is operated in the usual manner and the cut grass is thrown rearwardly from the reel. Hitherto much of the grass so cut, and particularly short blades, fall short of the ground roller 11 and is rolled onto the lawn again and also a considerable quantity drops onto the front part of the catcher 22 instead of being piled up at the middle or rear part thereof. In the use of my device as illustrated in Figs. 1 and 2 it is obvious that practically all the grass is caught on the lower part of the conveyer. Short blades will strike the roller 19 if they have not sufficient momentum to reach the conveyer, but they will be thrown rearwardly by the rotary action of said roller onto the conveyer. In Fig. 4 it is clear that the belt 22 is simply lengthened forwardly and roller 20 is omitted. The rollers 21 and 20 are readily adjustable to proper frictional contact with the ground roller by simply adjusting the bearing arms 18—19 and fixing them by tightening the bolts 16.

I claim:

In a lawn mower having a pair of spaced traction wheels, a cutting reel operated by the movement of said wheels and a ground contacting roller rearward of said reel; a grass catcher and conveyor comprising an endless apron and arranged in an upward and rearwardly inclined plane from said ground roller, a roller engaging each of the opposite turns of said conveyer, one of said rollers with the said apron frictionally engaging the ground roller to move the upper run of the conveyer rearwardly, angular bracket members removably fixed pivotally at both sides of the conveyer and extending rearwardly and upwardly to support the ends of the rear conveyer roller, and adjustable means for supporting said brackets at predetermined angles, said forward roller of the conveyer arranged to bear the conveyer down on the ground roller on top of the latter and rearward of its center, and an auxiliary roller engaging the ground roller forward of and above its center.

In testimony whereof I affix my signature.

JOHN CONRAD JOHNSON.